(12) United States Patent
Dawley et al.

(10) Patent No.: US 10,629,915 B2
(45) Date of Patent: Apr. 21, 2020

(54) BATTERY PACK WITH BATTERY CELLS HAVING ASYMMETRICAL PACKAGING AND SYMMETRICAL CURRENT FLOW PATHS

(71) Applicant: GM Global Technology Operations LLC, Detroit, MI (US)

(72) Inventors: Evan J. Dawley, Lake Orion, MI (US); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 15/946,803

(22) Filed: Apr. 6, 2018

(65) Prior Publication Data

US 2019/0312280 A1 Oct. 10, 2019

(51) Int. Cl.
*H01M 10/0525* (2010.01)
*H01M 4/66* (2006.01)
*H01M 10/04* (2006.01)
*H01M 10/647* (2014.01)
*H01M 2/10* (2006.01)
*H01M 2/26* (2006.01)
*H01M 2/30* (2006.01)
*H01M 10/0585* (2010.01)

(52) U.S. Cl.
CPC ......... *H01M 4/661* (2013.01); *H01M 2/1083* (2013.01); *H01M 2/266* (2013.01); *H01M 10/045* (2013.01); *H01M 10/0413* (2013.01); *H01M 10/647* (2015.04); *H01M 2/30* (2013.01); *H01M 10/0585* (2013.01); *H01M 2220/20* (2013.01)

(58) Field of Classification Search
CPC ........................ H01M 10/0525; H01M 10/052
See application file for complete search history.

(56) References Cited

U.S. PATENT DOCUMENTS

2010/0104927 A1* 4/2010 Albright ............. H01M 2/0242
429/50

* cited by examiner

*Primary Examiner* — Olatunji A Godo
(74) *Attorney, Agent, or Firm* — Quinn IP Law

(57) ABSTRACT

A battery cell has positive and negative cell tabs protruding from a first edge and a cell stack-up within a pouch. Anode and cathode foils are connected to the cell tabs proximate the first edge, with the anode foils connected to each other proximate a second edge. An outermost current collector of the anode foils exists with respect to a thickness of the cell stack-up. The cathode foils are connected to the positive cell tab proximate the first edge. The anode foils are connected to each other and the negative cell tab proximate the second edge, such that the outermost current collector forms an internal bus bar between the first and second edges. The battery cell has asymmetrical packaging and symmetrical internal current paths. A system includes a battery pack driving a load, with the battery pack having battery cells constructed as set forth above.

20 Claims, 3 Drawing Sheets

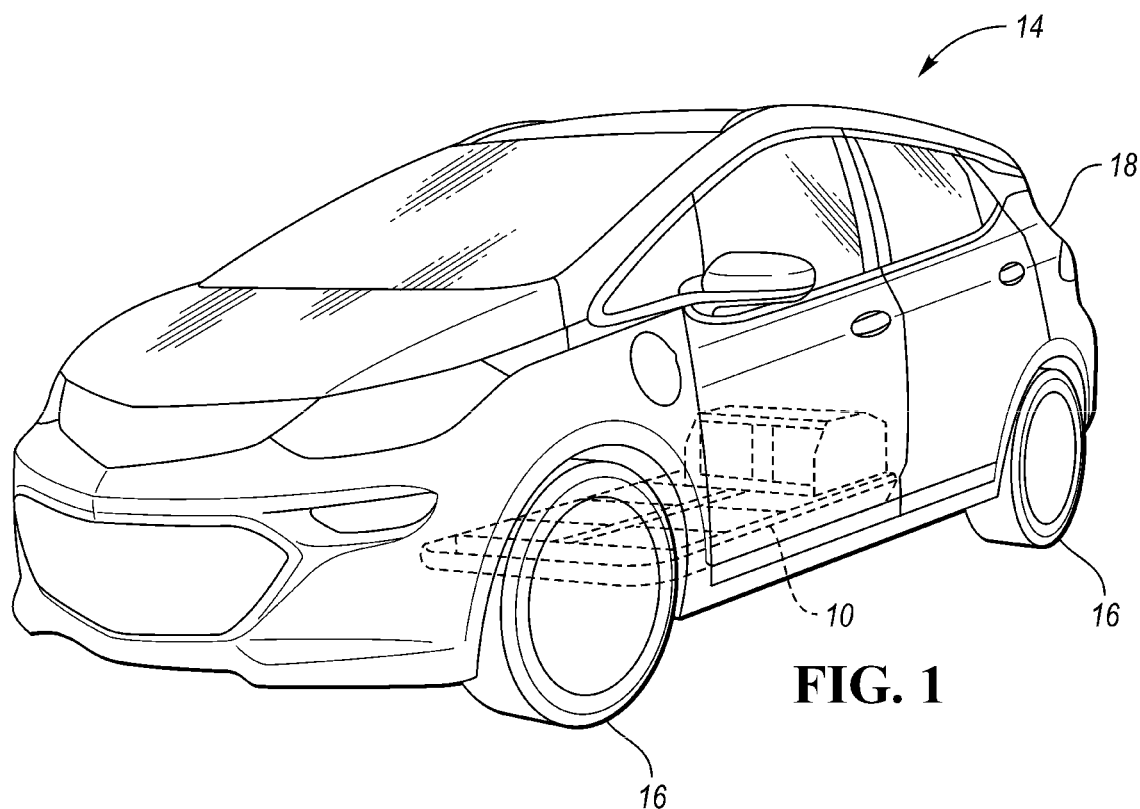
FIG. 1
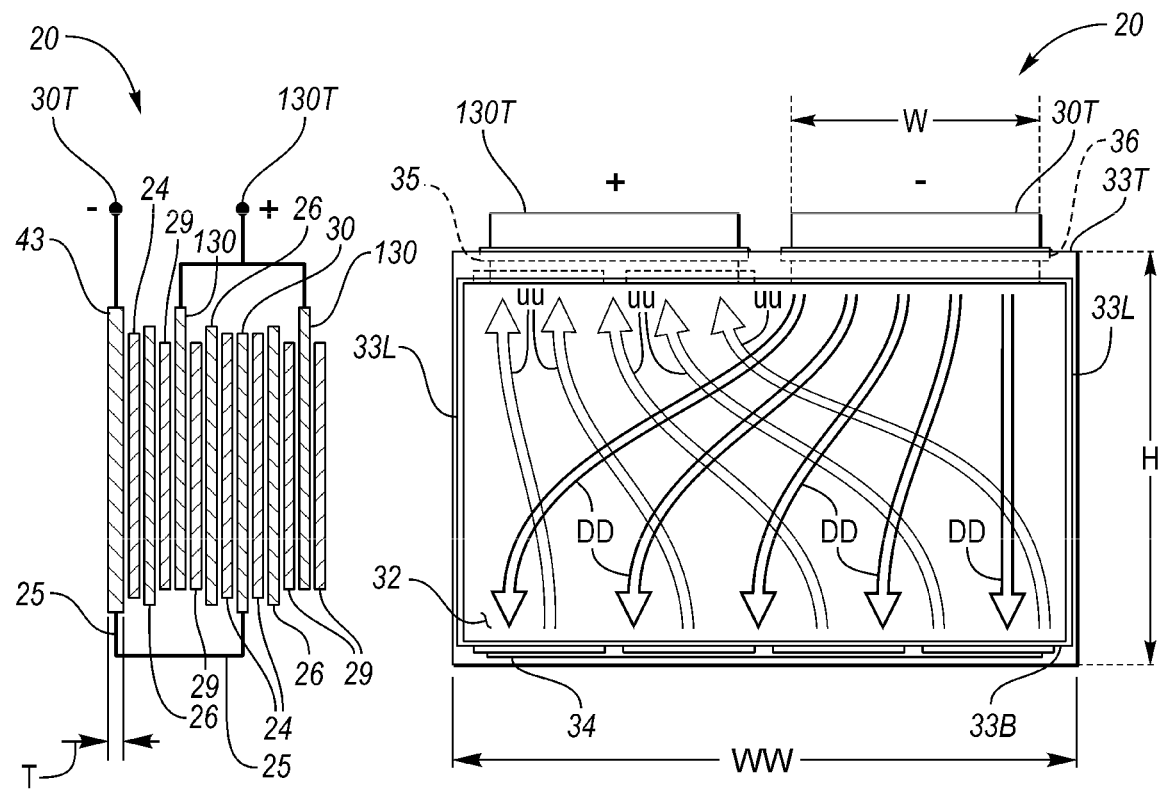
FIG. 2A  FIG. 2B

BATTERY PACK WITH BATTERY CELLS HAVING ASYMMETRICAL PACKAGING AND SYMMETRICAL CURRENT FLOW PATHS

INTRODUCTION

Electrochemical battery cells and battery packs are used for powering torque-generating electric machines, accessory modules, or other electrical loads aboard various systems. A typical battery pack includes multiple rechargeable battery cells. In the internal multi-layered stack-up of certain battery cell configurations, an insulating material referred to as a separator layer is disposed between oppositely-charged electrode foils, i.e., cathode and anode foils, and enclosed within a sealed pouch containing an electrolyte solution. The separator material, such as a thin polyethylene and/or polypropylene film, helps prevent electrical short conditions within an internal electrical circuit of the battery cell while permitting a free transfer of electrons between the electrodes.

The electrode foils may be constructed of thin sheets of a suitable conductive material, for instance aluminum foil for the cathode and copper foil for the anode. The electrode foils are coated with an application-suitable active material such as lithium oxide or graphite. Positive and negative cell tabs are electrically connected to internal tab leads of the respective electrodes using ultrasonic welding, conductive bonding, or another conductive joining technique, such that the cell tabs protrude a short distance from a perimeter edge of the foil pouch. The cell tabs are thus accessible terminals for a welding operation when constructing the battery pack.

Battery cell stack-ups having the above-noted foil pouch construction may have a cell tab configuration that is either symmetrical or asymmetrical. A symmetrical configuration is sometimes referred to in the art as an "N-type" configuration, while the asymmetrical configuration may be described as a "P-type" configuration. In a symmetrical battery cell configuration, the positive and negative cell tabs protrude from diametrically opposite perimeter edges of the foil pouch. In contrast, the cell tabs of an asymmetrical battery cell protrude from the same perimeter edge, i.e., in a side-by-side arrangement. The cell tabs of multiple similarly-constructed battery cells, whether symmetrical or asymmetrical in external packaging construction, are electrically interconnected via a conductive interconnect member to construct a battery pack having an application-specific voltage capacity.

SUMMARY

A battery cell is disclosed herein that provides the above-noted asymmetrical external packaging in conjunction with symmetrical internal current flow. As such, the disclosed battery cell combines desirable packaging efficiency, i.e., improved volumetric efficiency, with improved current distribution. The battery cell may include an outer foil pouch containing the above-noted cell stack-up in an electrolyte material. The electrode terminals, referred to herein as cell tabs, are positioned on/protrude from the same lateral edge of the foil pouch, i.e., a common edge, to provide the desired asymmetrical volumetric/packaging efficiency. However, electrical current flow paths within the battery cell are symmetrical. That is, an extended distance is provided between electrodes inside of the foil pouch in order to improve overall current distribution and uniformity.

It is recognized herein that a symmetrical cell configuration, while generally providing a more optimal level of current distribution and uniformity of current flow, tends to consume additional packaging space due to the diametrically opposite location of the cell tabs and required electrode weld joints. As a result, the volumetric efficiency of a symmetrical cell configuration is generally lower than that of an asymmetrical cell configuration. Asymmetrical battery cells tend to utilize available space in a battery module more efficiently due to the side-by-side location of the cell tabs, but this benefit may come at the cost of reduced current distribution efficiency. The present disclosure is therefore intended to improve upon existing battery cell volumetric efficiency without degrading intra-cell current performance.

A particular embodiment of the battery cell has an outer pouch with diametrically opposed first and second edges, positive and negative cell tabs protruding from the first edge, and a cell stack-up positioned within the pouch. The cell stack-up includes a plurality of anode foils and a plurality of cathode foils. An outermost current collector, e.g, of the anode foils, is "outermost" with respect to its relative position with respect to a thickness of the cell stack-up. The cathode foils are electrically connected to the positive cell tab proximate the first edge, e.g., via a cathode tab lead, and the plurality of anode foils are electrically connected to each other and the negative cell tab, e.g., via an anode tab lead, proximate the second edge. The outermost current collector forms an internal bus bar extending between the first and second edges, such that the battery cell has an asymmetrical packaging configuration and a symmetrical internal current path configuration.

The tab leads of the anode may be coextensive with, at most, 45 percent of a width of the second edge according to one possible embodiment. In another embodiment, the tab leads of the anode are coextensive with up to 90 percent of the width of the second edge. In general, the exact percentage is a function of cell width as set forth herein.

Each anode foil may include an open-circuit feature configured to steer electrical current flow within the battery cell. The open-circuit feature may include slots that are stamped or formed in a respective surface of the anode foils.

The cathode foils may be constructed of aluminum and coated with a first application-suitable active material, such as but not limited to a lithium oxide, e.g., lithium cobalt oxide, lithium manganese oxide, or lithium nickel manganese cobalt (NMC) oxide. The anode foils may be constructed of copper and coated with a second application-suitable active material that is distinct from the first active material, e.g., graphite.

A tab width of each of the positive and negative cell tabs may be about half of a width of each of the anode and cathode foils, respectively. The tab width may be about 90 mm or larger in some embodiments.

A system includes a battery pack powering a load, e.g., drive wheels of a motor vehicle, with the battery pack constructed from a plurality of the above-described battery cells.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 1 is a schematic illustration of an example motor vehicle using a multi-cell battery pack constructed of battery cells of the type described herein.

FIG. 2A is a schematic cross-sectional view illustration of an example battery cell, also shown in FIG. 2B, depicting symmetrical internal current flow path and corresponding structure.

FIG. 2B is a schematic plan view illustration of the example battery cell of FIG. 2A, with asymmetrical packaging and symmetrical internal current flow paths.

Figure 3A:
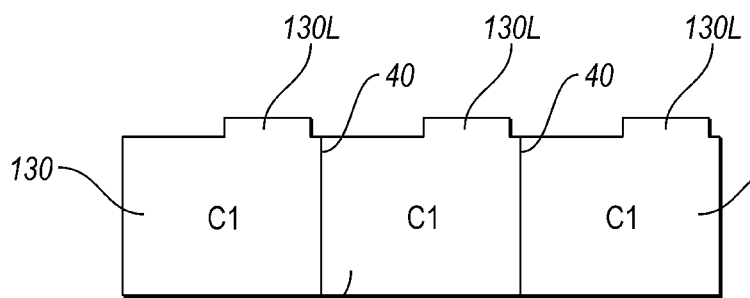
FIGS. 3A, 3B, and 3C collectively depict plan view illustrations of a plurality of cathodes, anodes, and current collectors, respectively, usable in constructing a battery cell as shown in FIG. 2B.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like components throughout the several views, a battery pack 10 is shown in FIG. 1 as part of a system 14, e.g., a motor vehicle having a drive wheels 16 arranged with respect to a body 18. The battery pack 10 electrically powers the drive wheels 16 or another load aboard the system 14, e.g., a generator, electric motor, auxiliary power unit, compressor, etc. The battery pack 10 of FIG. 1 may be variously configured as a rechargeable lithium-ion or nickel-cadmium battery pack in non-limiting example embodiments. Other embodiments may be envisioned having different shapes or power ratings, or that employ other active materials, and therefore the specific configuration of FIG. 1 is exemplary and non-limiting.

The battery pack 10 includes a plurality of pouch-type battery cells 20 constructed as depicted in FIGS. 2A and 2B or the various alternative embodiments disclosed herein. As set forth below with reference to FIGS. 2A-6, each battery cell 20 of the battery pack 10 has a symmetric internal current flow configuration and an asymmetric external packaging configuration, with the features collectively providing improved packaging efficiency without sacrificing optimal uniformity of internal current distribution.

The battery pack 10 may be a substantially flat "pancake"-style configuration as shown in which a plurality of the battery cells 20 described herein, e.g., eight or more such battery cells 20, are stacked one on top of the other. Such a configuration may be disposed below a floor pan (not shown) of the example system 14. Similar space-saving benefits are possible in other applications such as power plants, mobile platforms, or robots, or in other vehicle applications such as aircraft, spacecraft, or watercraft, and therefore the motor vehicle of FIG. 1 is illustrative of just one possible beneficial use of the battery pack 10.

Although omitted for illustrative simplicity, but well understood in the art, battery packs such as the example battery pack 10 of FIG. 1 may be optionally constructed using a "repeating frame" configuration in which individual cell frames form a coolant manifold and also provide structural rigidity to the battery cells 20 of FIGS. 2A and 2B, as well as the various alternative embodiments disclosed herein. For instance, two battery cells 20 may be arranged with respect to a pair of cell frames. In a typical configuration, a pair of the battery cells 20 containing the positive and negative electrodes, a thermal fin (not shown) defining internal coolant passages, and a foam divider (not shown) may be sandwiched between adjacent cell frames in a repeating arrangement throughout the battery pack 10. Coolant may then be admitted via a coolant port (not shown) to circulate through or around the battery cells 20.

Referring to FIGS. 2A and 2B, the external/packaging configuration of each battery cell 20 used as part of the battery pack 10 of FIG. 1 is asymmetric. As such, the battery cell 20 includes anode foils 30 and cathode foils 130, and also an outermost current collector 43, e.g., of the anode foils 30 as shown. The current collector 43 is electrically connected to anode foils 30, with such a connection indicated schematically in FIG. 2A via a conductive joint 25. The current collector 43 has or is connected to a negative (−) cell tab 30T. Although omitted from FIGS. 2A and 2B for illustrative clarity, electrical connection to cell tabs 30T and 130T may be via a respective intervening anode or cathode tab lead 30L or 130L (see FIGS. 3A and 3C), e.g., with the cell tabs 30T and 130T ultrasonically welded or otherwise conductively joined to the tab leads 30L or 130L. In FIG. 2B for example, the conductive joint between the cell tab 30T, i.e., the anode tab, and the tab lead 30L of the current collector 43 may occur in the area labeled 36, while the joint between cell tab 130T, i.e., the cathode tab, and the internal tab leads 130L may occur in the area labeled 35.

The anode foils 30 are separated from adjacent cathode foils 130 by a separator layer 26, i.e., a thin polyethylene and/or polypropylene film, which helps prevent electrical short conditions within the battery cell 20. The battery cell 20, or a sealed foil pouch 32 thereof as shown in FIG. 2B, has edges 33T, 33B, and 33L in a rectangular embodiment. That is, diametrically opposed edges 33L are orthogonally arranged with respect to edges 33T and 33B. The cell tabs 30T and 130T both extend from a common edge, e.g., the edge 33T. The cell tabs 30T and 130T, which are electrically connected within the foil pouch 32 of the battery cell 20 to a respective charge-specific electrode foil 30 or 130 as best shown in FIG. 2A, protrude from the edge 33T through a cell seal (not shown), or from another common edge 33B or 33L, with the cell seal forming a gasket or other structure surrounding the cell tabs 30T and 130T and thereby protecting the inside of the foil pouch 32 from dirt and moisture from the ambient.

The foil pouch 32 of FIG. 2B may be optionally constructed of laminated metal foil or other suitable materials. A rectangular or square pouch of polymer-coated aluminum may be used in some embodiments. While in the plan view perspective of FIG. 2B the foil pouch 32 has a top and a bottom edge 33T and 33B, respectively, the orientation of the battery cell 20 may or may not correspond to a top and bottom orientation of the battery pack 10 of FIG. 1. That is, the top of the battery cell 20 in a pancake-style battery pack 10 as shown in FIG. 1 may be toward a front of the vehicle 14 and the bottom of the battery pack 10 may be toward the rear of the vehicle 14. Thus, the terms "top" and "bottom" are terms of relative position intended to refer to the plan view orientation of FIG. 2B.

An example internal stack-up of the battery cell 20 is shown from left to right in FIG. 2A. Strip-shaped anode and cathode foils 30 and 130, e.g., copper and aluminum, respectively, may be coated with application-suitable respective first and second active material layer 24 and 29, distinct from each other. For instance, the active materials may include a carbonaceous material such as graphite and a lithium transition metal oxide, respectively, e.g., lithium cobalt, lithium manganese, or lithium nickel manganese cobalt (NMC) oxides. The cell tabs 30T and 130T that protrude from the edge 33T of the foil pouch 32 (see FIG. 2B) may or may not be coated with such materials. An outermost current collector 43 with respect to a thickness of the stack-up shown at far left in FIG. 2A serves as an electrical bus bar conducting electrical current from edge 33T of FIG. 2B to edge 33B. The electrode foils 30 are tied together internally proximate the edge 33B as illustrated via the conductive joint 25, i.e., electrically conductive structure or material corresponding to a conductive weld joint 34 as shown in FIG. 2B. That is, conductive joint 25 coincides with and joins together the tab leads 44 and 144 of the anode foil 30 and current collector 43 of FIGS. 3B and 3C, respectively, and located diametrically opposite to a location of the edge 33T from which the cell tabs 30T and 130T protrude. This construction provides the desired symmetrical internal current flow path noted herein. The outermost current collector 43 may have a calibrated thickness (T) that exceeds that of the anode foils 30 and cathode foils 130, as all electrical current from the battery cell 20 passes through the outermost current collector 43.

A first conductive joint 35 as best shown in FIG. 2B forms a cathode joint between the cathode tab 130T and the cathode tab lead 130L of FIG. 3A, spans less than half of the edge 33T, i.e., up to about 45 percent of a span/length of the edge 33T. A second conductive joint 36 is formed between anode tab 30T and the current collector lead 30L of FIG. 3C along the edge 33T. The relative positions of the cathode foils 130 and the anode foils 30 may be reversed in other configurations. The conductive weld joint 34 shown on edge 33B of FIG. 2B may be about 280 mm wide in some embodiments, with the entire battery cell 20 having an approximate width (WW) of 310 mm. Tab widths (W) of the individual cells tabs 30T and 130T on edge 33T may be about 90-120 mm, with "about" meaning ±10 percent in an embodiment, and with the entire battery cell 20 having an approximate height (H) of about 250 mm in the same embodiment, with other relative sizes being possible in other embodiments.

As shown schematically in FIG. 2B, when the battery cell 20 discharges electrical energy in an example lithium-ion embodiment, lithium ions transfer from the negative cell tab 30T to the positive cell tab 130T in current flow paths (arrows DD) from the cell tab 30T to anode foils 30 through conductive weld joint 34, and in current flow paths (arrows uu) from the anode foils 30 through to the cell tab 130T through ion transfer to cathode foils 130.

The presence of such extra-wide cell tabs 30T, 130T, and wide conductive joint 34 as shown in FIG. 2B achieves a more uniform current density distribution with directional specificity for better thermal management of the battery cell 20. Ultimately, the thermal losses are improved due to reduced cell resistance, which in turn leads to lower joule heating and high power capability. The cathode foils 130 in this particular embodiment have fewer internal welds than the anode foils 30 so as to enable the desired packaging and volumetric efficiency. For instance, in FIG. 2B, four anode lead joints are shown along edge 33B, while two cathode joints are shown along edge 33T. Additionally, the provided configuration may enable, for instance, an 800 V/150 kW battery pack with ultra-low profile, e.g., less than 90 mm, due to the possible pancake module configuration, with a reduced number of battery cells 20 used in the battery pack 10 providing increased power capability.

Figure 3B:
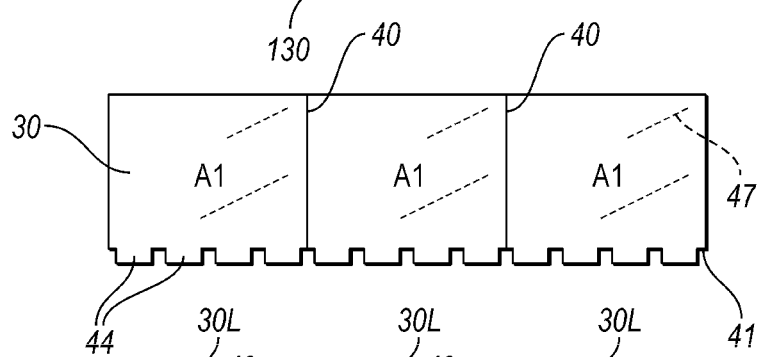
Figure 3C:
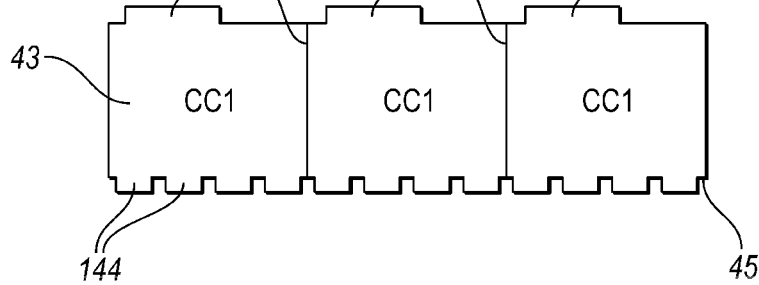
Figure 4:
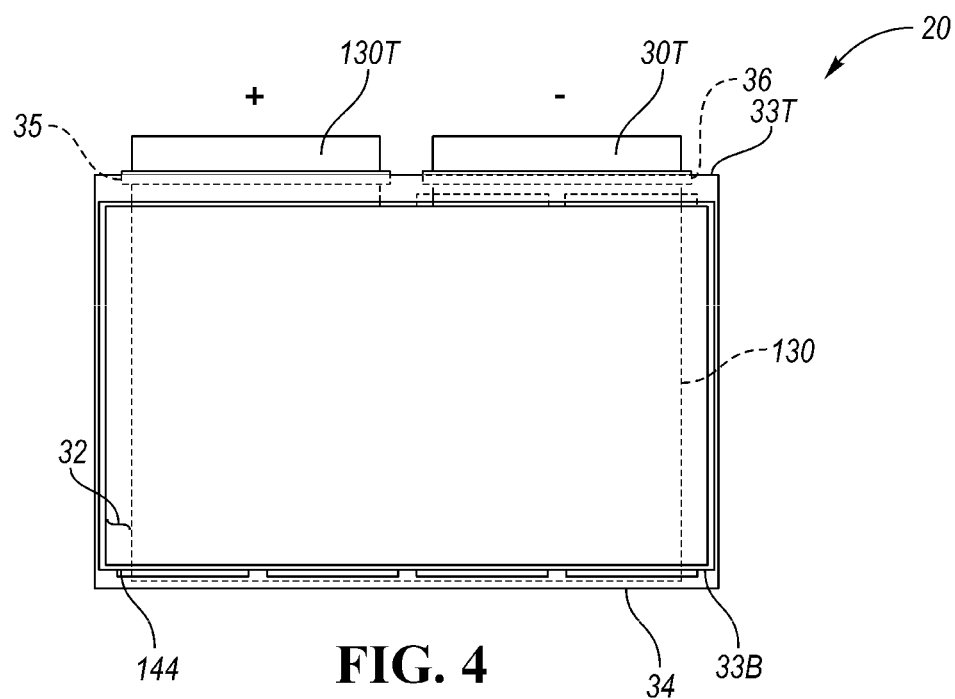
FIG. 4 is a schematic plan view illustration of an alternative embodiment of the battery cell shown in FIG. 2B in which cathode foils are connected along a bottom edge of the cell via an outermost conductor to a cathode tab located on a top edge of the cell.

FIGS. 3A, 3B, and 3C collectively depict a possible manufacturing approach for realizing the configuration of FIGS. 2A and 2B, with a battery cell 20 assembled from such a configuration shown in FIG. 2B. As shown in FIGS. 3B and 3C, multiple identically-configured anode foils (A1) 30 with corresponding tab leads 44 may be constructed from a single piece of foil, e.g., copper foil coated with an active material, and separated from each other by a separation feature 40. Separation feature 40 may include a shallow groove or notch formed by scoring the surfaces of the anode foils 30, thus facilitating separation of adjacent anode foils 30 during manufacturing. Although shown on the anode foils 30, such an approach may likewise be used on the cathode foils (C1) 130 in an alternative embodiment. Likewise, depending on the configuration, current collectors (CC1) 43 may be configured for attachment to/use as part of the anode foils 30 as shown or on/with the cathode foils 130.

Tab leads 44 and 144 span respective bottom or lower edges 41 and 45 of the anode foils 30 and current collectors 43 of FIGS. 3B and 3C, respectively, e.g., with four such leads 44 and 144 shown in the example embodiment of FIGS. 3B and 3C. When fully assembled as shown in FIG. 2B, the colocation of the tab leads 44 and 144 allows the tab leads 44 and 144 to be ultrasonically welded or otherwise conductively joined together along edge 33B of the foil pouch 32, i.e., as the joint 34. This feature enables the cell tabs 30T and 130T of FIG. 2B to protrude from a common edge of the battery cell 20, e.g., edge 33T in the illustrated embodiment.

Additionally as shown in FIG. 3B, optional open-circuit features 47 may be stamped or formed in a surface of the anode foils 30 to provide targeted utilization of the active materials coating the anode foils 30, or vice versa. That is, open-circuit features 47 such as slots having a predetermined size and location on the cathode foils 130 may be used to direct current flow in the cathode foil, or in the anode foil in other embodiments. The schematic electrical paths (arrows DD and uu of FIG. 2A) within the battery cell 20 may thus be varied using the open-circuit features 47. The presence of the open-circuit features 47 may steer electrical currents through predetermined paths in the cathode foils 130 lacking such open-circuit features 47 as the electrical current follows a path of least resistance.

Figure 5:
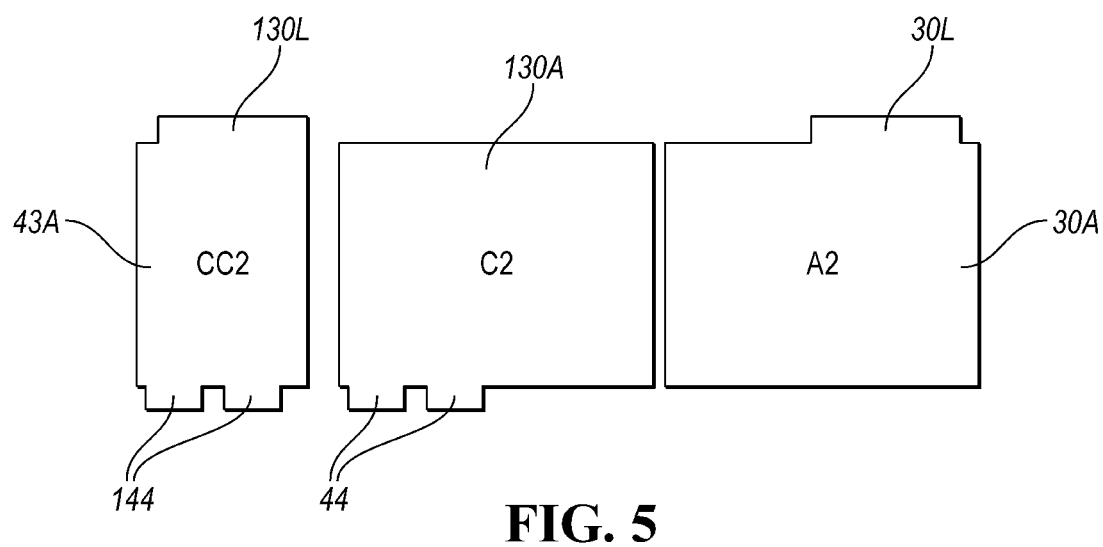
FIG. 5 is a schematic plan view illustration of an anode, cathode, and current collector for use in constructing a battery cell according to another possible embodiment.
Figure 6:
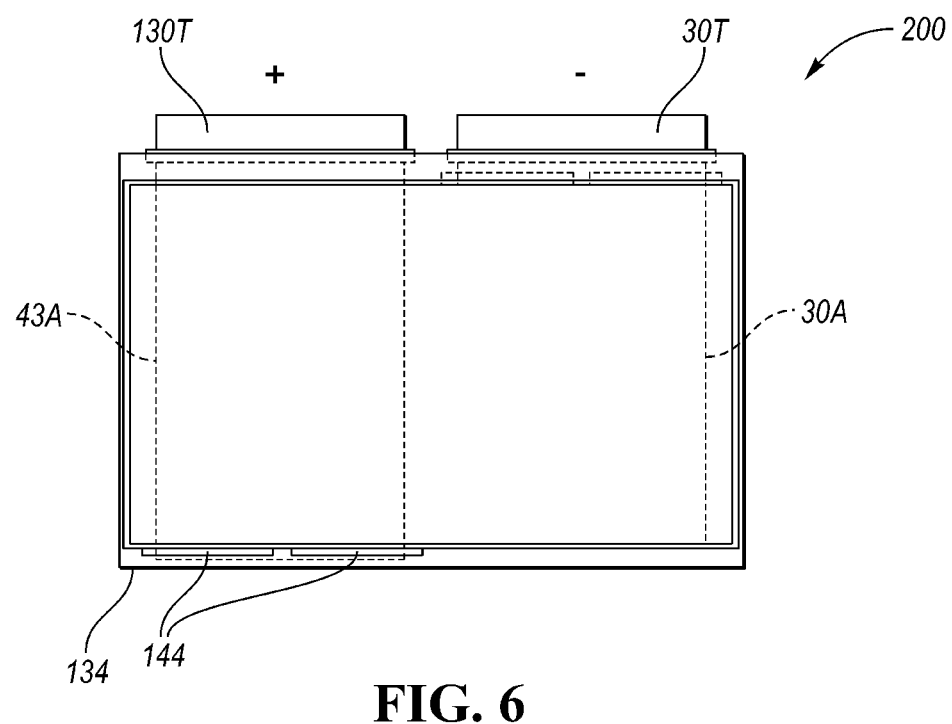
FIG. 6 is a schematic plan view illustration of a battery cell constructed using the example anode, cathode, and current collector of FIG. 5.

FIGS. 5 and 6 depict an alternative configuration of the approach respectively shown in FIGS. 2B and 3A-3C and FIG. 4. In FIG. 5, an internal bus bar/current collector (CC2) 43A, cathode foil (C2) 130A, and anode foil (A2) 30A, formed in a manner similar to that described above for FIGS. 3A-C, enable a simplified conductive weld joint 134 to be formed along the bottom edge 33B of the battery cell 20. Unlike the embodiment of FIGS. 2B and 4, wherein the conductive weld joint 34 is coextensive with edge 33B, e.g., extends at least 90 percent of the width of the edge 33B, the conductive weld joint 134 in the battery cell 200 of FIG. 6 is not co-extensive with the edge 33B, but rather extends about halfway along a width of the edge 33B, i.e., up to 45 percent of the width of the edge 33B. At minimum, a clearance is required between a given cell tab and the edge of the pouch, e.g., at least 15 mm per side. Thus, for an example cell width of 300 mm, the maximum width of a cell joint would be about 270 mm, i.e., 90 percent. Additionally, the cathode foils 130A have two tab leads 44, such as rectangular leads 44 as shown, overlapping the tab leads 144 of the current collector 43A when the battery cell 200 of FIG. 6 is constructed.

As described above with reference to FIGS. 1-6, a battery cell 20 is enabled which enjoys the beneficial combination of asymmetrical packaging and symmetrical current flow. By replacing a largely underutilized outermost electrode foil, for instance an outermost one of the anode foils 30 in a non-limiting exemplary case but also possible to implement as one of the cathode foils 130, and by joining the various electrode foils 30 to the outermost current collector 43 via the conductive joint 25, a total current from multiple anode foils 30 is transferred through the outermost current collector 43 to the cell tab 30T. This enables the outermost current collector 43 to act in the manner of an internal bus bar to the cell tab 30T, or to cell tab 130T in other embodiments when the outermost current collector 43 is part of a cathode assembly, in turn enabling more even distribution of the current flow within the battery cell 20 while preserving desirable volumetric efficiency benefits.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. A battery cell comprising:
a pouch having diametrically opposed first and second edges;
positive and negative cell tabs protruding from the first edge; and
a cell stack-up positioned within the pouch, the cell stack-up including a plurality of anode foils including an outermost current collector, and a plurality of cathode foils, the outermost current collector being an outermost one of the anode foils with respect to a thickness of the cell stack-up;
wherein the plurality of cathode foils are electrically connected to the positive cell tab proximate the first edge, and the plurality of anode foils are electrically connected to each other and to the negative cell tab proximate the second edge, such that the outermost current collector forms an internal bus bar extending between the first and second edges, with the battery cell having an asymmetrical packaging configuration and a symmetrical internal current path configuration.

2. The battery cell of claim 1, wherein each cathode foil of the plurality of cathode foils defines a plurality of tab leads proximate the second edge.

3. The battery cell of claim 2, wherein the plurality of tab leads is coextensive with up to 45 percent of a width of the second edge.

4. The battery cell of claim 3, wherein the plurality of tab leads is coextensive with up to 90 percent of the width of the second edge.

5. The battery cell of claim 1, wherein each anode foil of the plurality of anode foils includes an open-circuit feature configured to steer electrical current flow within the battery cell.

6. The battery cell of claim 5, wherein the open-circuit feature includes slots that are stamped or formed in a respective surface of the anode foils.

7. The battery cell of claim 1, wherein the anode foils are constructed of copper coated with a first active material and the cathode foils are constructed of aluminum coated with a second active material that is distinct from the first active material.

8. The battery cell of claim 1, wherein the outermost current collector has a thickness that exceeds that of other anode foils of the plurality of anode foils.

9. The battery cell of claim 1, wherein a tab width of each of the positive and negative cell tabs is about half of a width of each of the anode foils and cathode foils, respectively.

10. The battery cell of claim 9, wherein the tab width is at least 90 mm.

11. A system comprising:
a load; and
a battery pack having a battery housing containing a plurality of battery cells, the battery pack electrically powering the load, wherein each battery cell of the plurality of battery cells includes:
a pouch having diametrically opposed first and second edges;
positive and negative cell tabs protruding from the first edge; and
a cell stack-up positioned within the pouch, the cell stack-up including a plurality of anode foils having an outermost current collector, and a plurality of cathode foils, the outermost current collector being an outermost one of the anode foils with respect to a thickness of the cell stack-up;
wherein the plurality of cathode foils are electrically connected to the positive cell tab proximate the first edge, and the plurality of anode foils are electrically connected to each other and the negative cell tab proximate the second edge, such that the outermost current collector forms an internal bus bar extending between the first and second edges, with the battery cells having an asymmetrical packaging configuration and a symmetrical internal current path configuration.

12. The system of claim 11, wherein the system is a motor vehicle having a set of drive wheels, and wherein the load is the set of drive wheels.

13. The system of claim 11, wherein each anode assembly of the plurality of cathode foils defines a plurality of tab leads proximate the second edge.

14. The system of claim 13, wherein the plurality of tab leads is coextensive with up to 45 percent of a width of the second edge.

15. The system of claim 14, wherein the plurality of tab leads is coextensive with up to 90 percent of the width of the second edge.

16. The system of claim 11, wherein each cathode foil of the plurality of cathode foils includes an open-circuit feature configured to steer electrical current flow within the battery cells.

17. The system of claim 16, wherein the open-circuit feature includes slots that are stamped or formed in a respective surface of the cathode foils.

18. The system of claim 11, wherein the anode foils are constructed of copper and coated with a first active material and the anode foils are constructed of aluminum coated with a second active material that is distinct from the first active material.

19. The system of claim 11, wherein the outermost current collector has a thickness that exceeds that of other anode foils of the plurality of anode foils.

20. The system of claim 11, wherein a tab width of each of the positive and negative cell tabs is about half of a width of each of the anode foils and cathode foils, respectively.

* * * * *